C. RUDOLPH.
PIPE COUPLING.
APPLICATION FILED FEB. 27, 1909.

1,054,244.

Patented Feb. 25, 1913.

Witnesses.

Charles Rudolph
By his attorney

UNITED STATES PATENT OFFICE.

CHARLES RUDOLPH, OF PARIS, FRANCE, ASSIGNOR TO CHAS. T. SCHOEN, OF PHILADELPHIA, PENNSYLVANIA.

PIPE-COUPLING.

1,054,244.  Specification of Letters Patent.  Patented Feb. 25, 1913.

Application filed February 27, 1909. Serial No. 480,364.

*To all whom it may concern:*

Be it known that I, CHARLES RUDOLPH, a citizen of the Republic of France, and a resident of 66 Rue du Theâtre, Paris, France, have invented certain new and useful Improvements in Pipe-Couplings, of which the following is a full, clear, and exact description, such as will enable others skilled in the art to which it appertains to carry out the same.

This invention relates to improvements in pipe unions or couplings which are fitted to the ends of flexible metallic pipes and it applies to that kind of pipe which is formed by a suitably shaped metal strip being helically wound, and covered with a sheathing preferably formed by a metallic plait or braiding.

When a coupling piece is fixed to the extremity of a pipe covered with a sheath or cover of the kind indicated, it frequently happens that when the pipe is elongated in consequence of internal pressure, the sheath which covers it slips out of the coupling if it is not firmly fixed and cannot return to its original position when the pipe resumes its normal length.

Now this invention has for its principal object to provide a coupling which embraces the sheath or cover and the pipe in such a way that the sheath can no longer slip out of the coupling but is forced to follow the pipe in its elongations and contractions.

A further object of this invention is the provision of a novel means whereby an air and water tight joint may be produced while at the same time providing further security for the inner tube.

The manner in which the invention is carried out will now be described, reference being made to the accompanying drawings, in which:—

Figure 1:
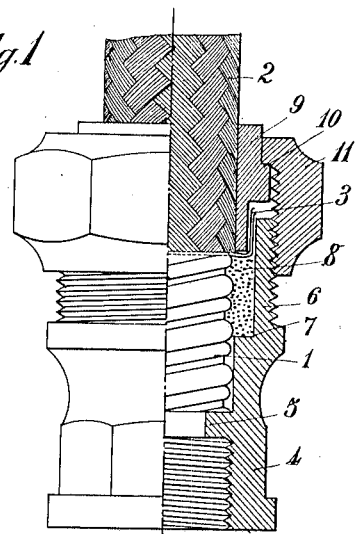
Figure 2:
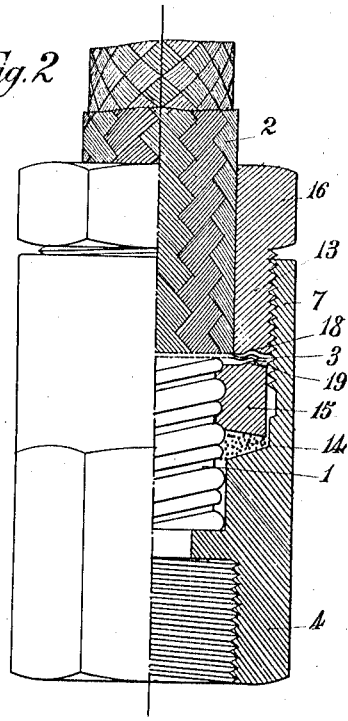
Figure 4:
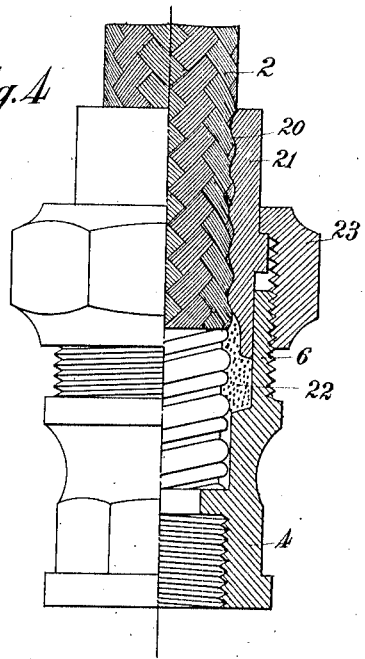
Figure 3:
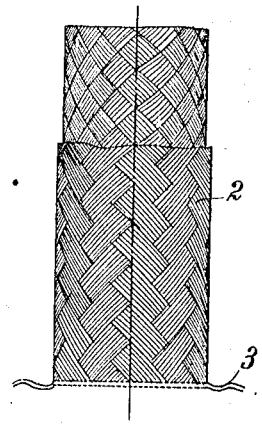

Figure 1 shows partly in elevation and partly in longitudinal section the coupling or union made in accordance with this invention: Fig. 2 is a modification of the coupling shown in Fig. 1; Fig. 3 is an elevation of the sheath or cover with its end expanded, in order to be engaged in the coupling; Fig. 4 is a view partly in elevation and partly in longitudinal section of a modification of the method of carrying out the invention.

The flexible pipe 1 is formed by a suitably shaped helically wound strip of metal the edges of which interlock. This tube or pipe is protected by a sheath or cover 2 formed of a metallic plait or braid. The pipe or tube may be covered with a single sheath, or two sheaths, as shown in Figs. 2 and 3, or with a larger number of sheaths.

Fig. 1 shows a method of fixing both the flexible pipe 1 and its sheath 2 in the coupling. The metallic sheath formed preferably by plaited wires, is stopped at a small distance from the end of the pipe, and the wires are unplaited so as to form an enlargement or extension 3, as shown in Fig. 3. The coupling proper is composed of an internally threaded tubular part 4, having above the threaded part an annular internal rib or shoulder 5 serving as a support and stop for the end of the pipe. The tubular part 4 of the joint is prolonged in an externally threaded socket 6, and packing 8 for insuring the tightness of the joint is lodged in the annular internal space 7. The expanded end 3 of the braided sheath is bent in such a way as to be pressed on the external surface of a packing ring 9 and in this way it is solidly held between the socket 6 and the ring 9. This latter has an annular rib or shoulder 10 against which a nut 11 bears, which is screwed on the socket 6. In this way the pipe and its sheath are both fixed in the coupling piece and cannot escape therefrom. When the packing ring 9 is forced forward by the nut 11, the packing 8 is forced into the spaces between the helices which form the inner tube 1, and there is thus produced an additional securing means for the inner tube. This feature is present in all of the modifications of my device which I have shown.

Having now particularly described and ascertained the nature of my said invention and in what manner the same is to be performed, I declare that what I claim is:—

A coupling for flexible metallic pipes covered by a plaited sheath, comprising in combination, a packing ring 9, a socket 4, a nut 11 surrounding said ring, threaded to said socket and adapted to draw the two together, and an unplaited portion of the sheath bent outward over said packing ring first at right angles to the pipe and then backward parallel to the pipe between the said packing ring and socket, substantially as described.

In testimony whereof I have hereunto set my hand in the presence of the two subscribing witnesses.

CHARLES RUDOLPH.

Witnesses:
FRANÇOIS DU BOISROUDRAY,
H. C. COXE.